June 18, 1929.                G. I. GOODWIN                1,717,681
                           TWO-SPEED STEERING GEAR
                             Filed May 19, 1928
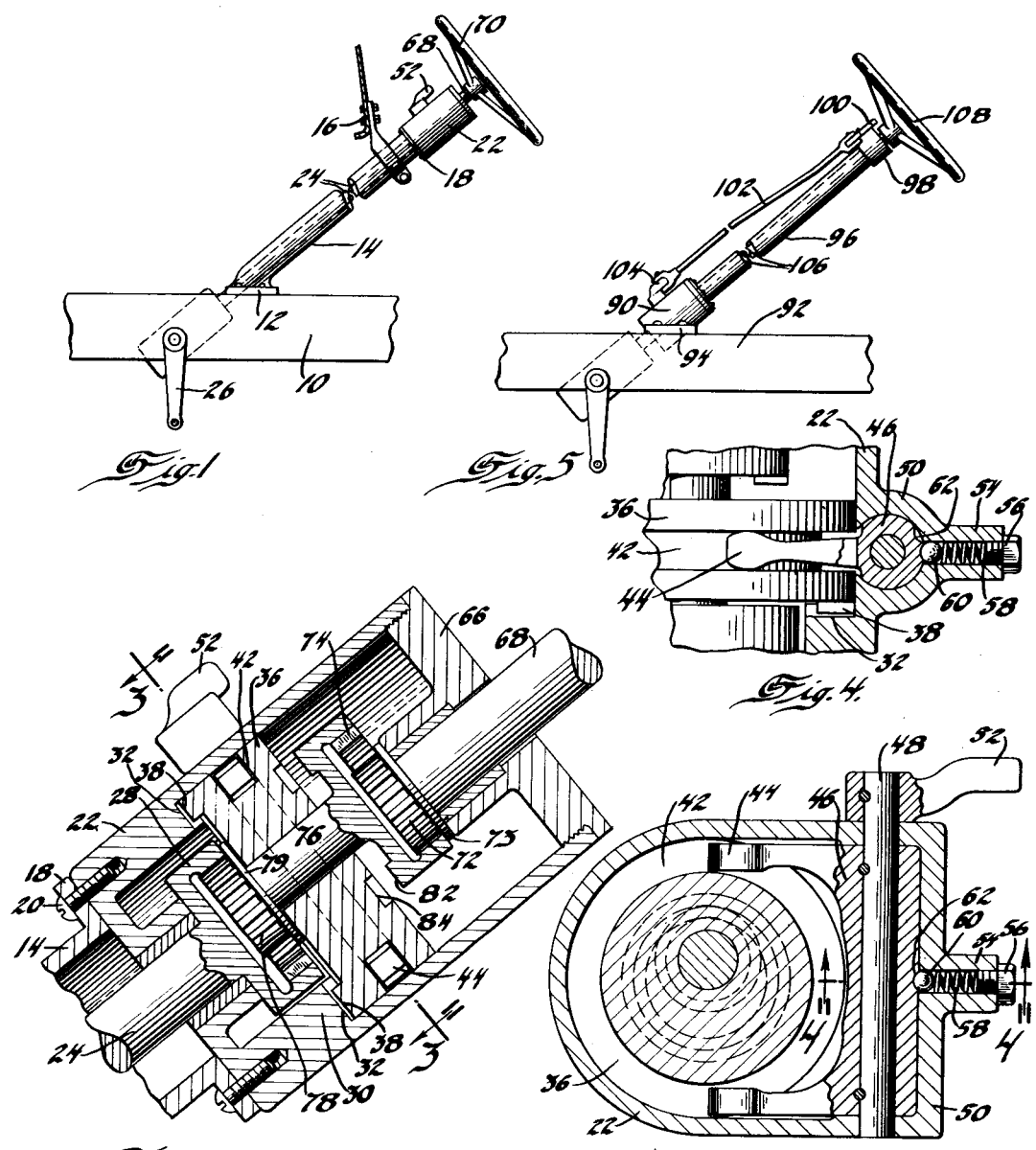
Inventor
George I. Goodwin
By Blackmore, Spencer & Hink
Attorneys

Patented June 18, 1929.

1,717,681

UNITED STATES PATENT OFFICE.

GEORGE I. GOODWIN, OF DETROIT, MICHIGAN, ASSIGNOR TO GENERAL MOTORS RESEARCH CORPORATION, OF DETROIT, MICHIGAN, A CORPORATION OF DELAWARE.

TWO-SPEED STEERING GEAR.

Application filed May 19, 1928. Serial No. 279,172.

This invention relates to steering mechanism and more particularly to steering mechanism of an automotive vehicle.

The advent of the large section low pressure automobile tire has been accompanied by a consequent increase in the effort required to manipulate the steering wheel. This fact has been especially noticeable in slow traffic and while parking the car or driving slowly at any time when considerable turning is required.

It is an object of the invention to avoid the steering difficulties occasioned by the substitution of the balloon tire for the rigidly inflated tire by making steering easy under all conditions. I accomplish this result by providing a two ratio steering gear so that when the car is moving slowly and the resistance of the front wheels to steering movement is consequently greatest, the operator may, if he desires, have the advantage of a better leverage than is necessary or desirable when the car is moving with greater speed. The invention also relates to certain features of construction of the two ratio steering gear.

Other objects and advantages of the invention will appear in the course of the following description, taken in connection with the accompanying drawing and appended claims.

In the drawing:

Figure 1 is a side view of a steering column embodying my invention.

Figure 2 is a vertical longitudinal section through the steering gear transmission mechanism.

Figure 3 is a section on the line 3—3 of Figure 2.

Figure 4 is a section on the line 4—4 of Figure 3.

Figure 5 is a side view similar to Figure 1 but showing a modified form of my invention.

Referring to the drawing, I have illustrated in Figure 1 a longitudinal chassis frame member 10 on which is rigidly fixed a bracket 12 integral with a sleeve 14 the upper end of which extends through and is rigidly supported in the dashboard 16 of the vehicle. At its upper end the sleeve 14 is flanged outward as at 18, and supported on the flange 18 by means of screws 20 is a cylindrical transmission casing 22.

Journaled in the lower end of casing 22 is a lower steering shaft or worm shaft 24 extending downward within the sleeve 14 and operatively connected at its lower end, by any usual or desired means, with a pivoted steering arm 26 which may be connected with the guide wheels (not shown) in the usual manner. On its upper end within the casing 22 the shaft 24 is formed with an internal gear 28.

The wall of the casing 22 is thickened in the lower end as indicated at 30 and the upper side of this thickened portion is formed with two oppositely disposed recesses 32. Rotatable within and slidable axially of the casing 22 is a bearing member 36, formed on its lower side with lugs 38 adapted to fit in the recesses 32. Journaled eccentrically in the bearing member 36 is a shaft 76 carrying on its lower end a pinion 78 in mesh with the internal gear 28, and formed on its upper end with an internal gear 74.

Journaled in the removable upper end 66 of the casing 22 is a shaft 68 on the upper end of which is fixed a steering wheel 70, the shaft 68 being axially aligned with the shaft 24. On its lower end within the casing 22 the shaft 68 has fixed thereto a pinion 72 in mesh with the internal gear 74 on the shaft 76. On its lower side the internal gear 74 is formed with oppositely disposed lugs 82 adapted to seat within similarly disposed recesses 84 on the upper side of the bearing member 36. The eccentricity of the shaft 76 is such that the pinion 78 is always in mesh with the gear 28 while the gear 74 remains in mesh with the pinion 72.

Fixed to the upper side of the pinion 72 is a flat ring 73 while fixed to the upper side of the pinion 78 is a similar ring 79. Each ring extends outward beyond the teeth of its respective pinion in position to abut against the face of the adjacent gear. Ring 73 serves to hold the shaft 76 against upward movement while ring 79 serves to hold the shaft 76 against downward movement.

The bearing member 36 is formed with a circumferentially extending groove 42 into which are extended the rounded ends 44 of a fork 46 the hub of which is fixed on a shaft 48 journaled in a widened out portion 50 in the casing 22. A control lever 52 is fixed on one end of shaft 48 outside of the casing 22 for rotating the shaft a limited amount for sliding the bearing member 36 axially within the casing 22. The extended portion 50 is formed with a hollow boss 54 threaded at its outer end for receiving a bolt 56. Within the boss 54 is a coil spring 58 pressing against a spherical pawl 60 adapted to seat in one of two adjacent arcuate notches 62 in the hub of fork 46. By this construction the shaft 48 may be rocked to hold the bearing member 36 in one of two axially spaced positions, in the lower one of which the bearing member is locked to the casing 22 and in the upper one of which the bearing member is locked with the gear 74, and hence with the shaft 76.

In its lower position the bearing member 36 is held locked to the casing 22, and rotation of the steering wheel shaft 68 is then transmitted through the pinion 72 to the internal gear 74 and through the pinion 78 to the internal gear 28 on shaft 24, these connections functioning as reduction gearing. When the arm 52 is moved to position the bearing member 36 in its upper position with the lugs 82 engaging in the recesses 84, the bearing member 36 is rotated with shaft 68, thus giving a direct drive, or a gear ratio of one to one between shafts 68 and 24.

In Figure 5 I have illustrated a modified form of my invention in which a transmission casing 90 is supported on a longitudinal frame member 92 of a vehicle by means of a bracket 94 formed integral with the casing and fixed to the member 92. The mechanism within the casing and the connection of this mechanism with the guide wheels of the vehicle are the same as that illustrated and described with reference to Figures 2, 3 and 4. Fixed to the upper side of the casing 90 is a sleeve 96 extending upward and rearward and having fixed at its upper end a bearing support 98. Pivoted on the bearing support 98 is a bell crank lever 100, the lower arm of which is connected by a link 102 with the shifting mechanism control lever 104, which corresponds to the control lever 52 described above. If desired, the upper end of sleeve 96 may be supported by the vehicle dashboard in the usual way, similar to that shown in Figure 1. A steering shaft 106 extends from the casing 90 upward within the sleeve 96 and is journaled adjacent its upper end in support 98. The usual steering wheel 108 is fixed to the upper end of shaft 106.

With this construction the control lever, which is the bell crank lever 100, is positioned close to the steering wheel where it is readily accessible to the operator, while the transmission gearing, which is relatively large and heavy, is supported adjacent the floor of the car where it will not be in the way of the operator and where it may be more rigidly supported.

In either construction the control lever is close to the steering wheel and within easy reach of the operator. By moving the control lever to one position, a direct drive is obtained as in the conventional steering mechanism, while a shift of the control lever to the other position provides reduction gearing between the upper and lower shafts so that the car can be easily steered while driving in slow traffic or parking. Since the direct drive need not be used in slow driving, the steering connections may be designed to give a lower leverage in the direct drive, and hence better control at higher speeds, than is practicable with conventional steering mechanism, since the latter must be used for both slow and rapid driving.

In the illustrated embodiment of my invention, the shift from one steering ratio to the other is accomplished manually and at will. It is obvious, however, that the shifting mechanism may be controlled in other ways which will occur to a skilled mechanic, such as by connecting it up with the vehicle transmission so that it is in direct drive when the vehicle transmission is in high gear and so that it will operate through the reduction gearing when the vehicle transmission is in a gear other than high, or by providing an automatic control which will normally remain in high but will automatically shift to low when the rim pull on the steering wheel exceeds any desired amount.

I claim:

1. Steering mechanism comprising a casing, a lower steering shaft extending within said casing and carrying an internal gear, an upper steering shaft carrying a steering wheel and extending into said casing, said shaft carrying a pinion within said casing, a bearing member slidable and rotatable in said casing, a connecting shaft eccentrically mounted in said bearing member, said shaft carrying a pinion meshing with said internal gear and an internal gear meshing with said upper pinion, and means for locking said bearing member to said casing or to said stub shaft.

2. Steering mechanism comprising a casing, a lower steering shaft extending within said casing and carrying an internal gear, an upper steering shaft extending within said casing, said shaft carrying a pinion within said casing, and a rotatable bearing member in said casing having eccentrically mounted therein a connecting shaft carrying a pinion meshing with said internal gear and an internal gear meshing with said upper pinion, said bearing member being slidable axially in said casing for locking with said casing or with said connecting shaft.

3. Steering mechanism comprising a casing, a lower steering shaft extending within said casing and carrying an internal gear, an upper steering shaft extending within said casing, said shaft carrying a pinion within said casing, a rotatable bearing member in said casing having eccentrically mounted therein a connecting shaft carrying a pinion meshing with said internal gear and an internal gear meshing with the upper pinion, said bearing member being slidable axially in said casing for locking with said casing or with said connecting shaft and control means for holding said bearing member in either position.

4. Steering mechanism comprising a casing, a steering shaft journaled in said casing and projecting from one end thereof, a second aligned steering shaft journaled in said casing and projecting from the other end thereof, a shaft within said casing parallel to but eccentric with reference to the aligned shafts, means for holding said eccentric shaft from bodily rotation about the axis of the aligned shafts, said means comprising a part journalling said eccentric shaft and movable into locking engagement with said casing.

In testimony whereof I affix my signature.

GEORGE I. GOODWIN.